United States Patent
Liu

(10) Patent No.: US 10,291,371 B2
(45) Date of Patent: May 14, 2019

(54) METHOD, USER EQUIPMENT, AND BASE STATION FOR GENERATING PILOT SEQUENCE

(71) Applicant: HUAWEI TECHNOLOGIES CO., LTD., Shenzhen, Guangdong (CN)

(72) Inventor: Kunpeng Liu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 77 days.

(21) Appl. No.: 14/538,051

(22) Filed: Nov. 11, 2014

(65) Prior Publication Data

US 2015/0063284 A1  Mar. 5, 2015

Related U.S. Application Data

(63) Continuation of application No. PCT/CN2012/075400, filed on May 11, 2012.

(51) Int. Cl.
*H04L 5/00* (2006.01)
*H04J 13/16* (2011.01)
(Continued)

(52) U.S. Cl.
CPC .......... *H04L 5/0048* (2013.01); *H04J 13/10* (2013.01); *H04J 13/16* (2013.01); *H04L 5/0078* (2013.01);
(Continued)

(58) Field of Classification Search
None
See application file for complete search history.

(56) References Cited

U.S. PATENT DOCUMENTS

2011/0077038 A1* 3/2011 Montojo ............... H04B 7/024
                                                              455/507
2012/0099730 A1  4/2012 Nakamura et al.
(Continued)

FOREIGN PATENT DOCUMENTS

CN    101938296        1/2011
CN    102142918        8/2011
WO    2011/001458 A1   1/2011

OTHER PUBLICATIONS

Partial Supplementary European Search Report dated Mar. 3, 2015 in corresponding European Patent Application No. 12876505.4.
Catt, "UE-specific DM-RS configuration", 3GPP TSG RAN WG1 Meeting #68, Dresden, Germany, Feb. 2012, 3 pp.
Sharp, "DL MRS enhancement for CoMP", 3GPP TSG RAN WG1 Meeting #68, Dresden, Germany, Feb. 2012, pp. 1-9.
(Continued)

Primary Examiner — Gary Mui
(74) Attorney, Agent, or Firm — Staas & Halsey LLP

(57) ABSTRACT

The present invention discloses are a method, a user equipment, and a base station for generating a pilot sequence. The method includes: determining a first parameter used to generate a pilot sequence in a first parameter candidate set, where the first parameter candidate set includes at least two timeslot numbers of the following timeslot numbers: a timeslot number obtained after downlink synchronization, a predefined timeslot number, timeslot numbers in a second type pilot configuration parameter, a timeslot number obtained from a high layer notification, and a timeslot number obtained from a dynamic notification, where a second type pilot is different from a pilot corresponding to the pilot sequence; and generating the pilot sequence according to the first parameter.

17 Claims, 8 Drawing Sheets

100

Determine a first parameter used to generate a pilot sequence in a first parameter candidate set, where the first parameter candidate set includes at least two timeslot numbers of the following timeslot numbers: a timeslot number obtained after downlink synchronization, a predefined timeslot number, timeslot numbers in a second type pilot configuration parameter, a timeslot number obtained from a high layer notification, and a timeslot number obtained from a dynamic notification, where a second type pilot is different from a pilot corresponding to the pilot sequence  ～ S110

Generate the pilot sequence according to the first parameter  ～ S120

(51) Int. Cl.
*H04J 13/10* (2011.01)
*H04L 7/00* (2006.01)
*H04L 29/06* (2006.01)
*H04L 25/02* (2006.01)
*H04L 27/26* (2006.01)

(52) U.S. Cl.
CPC ........ *H04L 7/0008* (2013.01); *H04L 25/0226* (2013.01); *H04L 27/2613* (2013.01); *H04L 69/22* (2013.01)

(56) References Cited

U.S. PATENT DOCUMENTS

| | | | | |
|---|---|---|---|---|
| 2013/0064168 A1* | 3/2013 | Song | H04L 27/2611 | 370/315 |
| 2013/0201942 A1* | 8/2013 | Kim | H04W 76/045 | 370/329 |
| 2013/0215845 A1* | 8/2013 | Lee | H04L 1/0072 | 370/329 |
| 2013/0308555 A1* | 11/2013 | Ho | H04L 5/0048 | 370/329 |
| 2015/0103765 A1* | 4/2015 | Wang | H04L 5/0048 | 370/329 |
| 2015/0334683 A1* | 11/2015 | Guo | H04L 5/0035 | 370/329 |
| 2015/0341958 A1* | 11/2015 | Guo | H04W 72/042 | 370/329 |

OTHER PUBLICATIONS

Texas Instruments, "Discussion on DMRS for DL CoMP", 3GPP TSG RAN WG1 Meeting #68, Dresden, Germany, Feb. 2012, pp. 1-2.
PCT International Search Report dated Feb. 28, 2013 in corresponding International Patent Application No. PCT/CN2012/075400.
International Search Report dated Feb. 28, 2013, in corresponding International Patent Application No. PCT/CN2012/075400.
Extended European Search Report dated Jan. 22, 2016 in corresponding European Patent Application No. 12876505.4.
"DL control Signaling in Support of CoMP", Texas Instruments, 3GPP TSG RAN WG1 Meeting # 66bis, R1-113252, Zhuhai, P.R. China, Oct. 10-14, 2011, pp. 1-3.
"Downlink DM-RS for Release 11", Renesas Mobile Europe Ltd., 3GPP TSG-RAN WG1 Meeting #68, R1-120379, Dresden, Germany, Feb. 6-10, 2012, 5 pp.
"Remaining issues for DL DMRS for CoMP", Hitachi Ltd., 3GPP TSG RAN WG1 Meeting #68bis, R1-121305, Jeju, Korea, Mar. 26-30, 2012, pp. 1-5.
"Dynamic Switching of DMRS Scrambling for Downlink CoMP", Samsung, 3GPP TSG RAN WG1 #68bis, R1-121629, Jeju, Korea, Mar. 26-30, 2012, 3 pp.
XP050599634, R1-121345, Newpostcom, "Remaining issues for down reference signals for CoMP," 3GPP TSG RAN WG1 Meeting #68, Jeju, Korea, Mar. 26-30, 2012 (4 pp.).
Communication Pursuant to Article 94(3) EPC, dated Oct. 19, 2018, in European Application No. 12876505.4 (6 pp.).

* cited by examiner

100

Determine a first parameter used to generate a pilot sequence in a first parameter candidate set, where the first parameter candidate set includes at least two timeslot numbers of the following timeslot numbers: a timeslot number obtained after downlink synchronization, a predefined timeslot number, timeslot numbers in a second type pilot configuration parameter, a timeslot number obtained from a high layer notification, and a timeslot number obtained from a dynamic notification, where a second type pilot is different from a pilot corresponding to the pilot sequence ⎯ S110

Generate the pilot sequence according to the first parameter ⎯ S120

Determine a second parameter used to generate the pilot sequence in a second parameter candidate set ⎯ S130

Determine the first parameter according to the second parameter ⎯ S111

Generate the pilot sequence according to the first parameter ⎯ S120

METHOD, USER EQUIPMENT, AND BASE STATION FOR GENERATING PILOT SEQUENCE

CROSS-REFERENCE TO RELATED APPLICATIONS

This application is a continuation of International Application No. PCT/CN2012/075400, filed on May 11, 2012, which is hereby incorporated by reference in its entirety.

TECHNICAL FIELD

The present invention relates to the field of communications, and in particular, to a method, a user equipment, and a base station for generating a pilot sequence.

BACKGROUND

In a third generation partnership project ("3GPP" for short) long term evolution ("LTE" for short) communication system, a formula for generating an initial sequence of a demodulation reference signal ("DMRS" for short) may be expressed as:

$$c_{init}(\lfloor n_s/2 \rfloor + 1) \cdot (2X+1) \cdot 2^{16} + n_{SCID} \quad (1)$$

$n_s$ is a timeslot number, X is a parameter dynamically selected from identifiers ID configured by a high layer, and $n_{SCID}$ is a scrambling code ID. For a coordinated multiple point ("CoMP" for short) scenario, by dynamically selecting a candidate value of X, pilot interference randomization among different users may be implemented, or pilot orthogonality is implemented. For example, by configuring a same X value for two users, scrambling code sequences are ensured to be the same, and differentiation is further performed through an orthogonal spreading code; and a specific ID of a cell can be configured for other users to implement interference randomization.

In the prior art, interference coordination of users between the cells is performed only by configuring X, for example, when values of X of two users are configured to be different, DMRS pseudo-orthogonality, that is, interference randomization, between the users can be implemented; when values of X are the same, orthogonal pairing between the two users can be implemented.

However, when timeslots of two cells are asynchronous, $n_s$ parameters are different. For example, a timeslot number of a cell A at a certain moment is $n_{sA}$, a timeslot number of a cell B is $n_{sB}$, and $n_{sA}$ is not the same as $n_{sB}$; in this case, even if the same X value is configured for an edge user of the cell A and an edge user of the cell B, the same scrambling code sequences cannot be generated because of a difference of $n_s$, and orthogonal pairing cannot be implemented.

SUMMARY

Embodiments of the present invention provide a method, a user equipment, and a base station for generating a pilot sequence, which can support orthogonal pairing between users under asynchronous cells.

In one aspect, an embodiment of the present invention provides a method for generating a pilot sequence, where the method includes: determining a first parameter used to generate the pilot sequence in a first parameter candidate set, where the first parameter candidate set includes at least two timeslot numbers of the following timeslot numbers: a timeslot number obtained after downlink synchronization, a predefined timeslot number, timeslot numbers in a second type pilot configuration parameter, a timeslot number obtained from a high layer notification, and a timeslot number obtained from a dynamic notification, where a second type pilot is different from a pilot corresponding to the pilot sequence; and generating the pilot sequence according to the first parameter.

In another aspect, an embodiment of the present invention provides a method for generating a pilot sequence, where the method includes: determining a first parameter used to generate the pilot sequence in a first parameter candidate set, where the first parameter candidate set includes at least two timeslot numbers of the following timeslot numbers: a downlink timeslot number of a primary serving cell, a predefined timeslot number, timeslot numbers in a second type pilot configuration parameter, and a timeslot number additionally configured by a network side, where a second type pilot is different from a pilot corresponding to the pilot sequence; and generating the pilot sequence according to the first parameter.

In still another aspect, an embodiment of the present invention provides a method for generating a pilot sequence, where the method includes: determining, according to a currently scheduled rank, a second parameter used to generate the pilot sequence, where the second parameter represents a virtual identifier ID; and generating the pilot sequence according to the second parameter.

In yet another aspect, an embodiment of the present invention provides a user equipment, where the user equipment includes: a first determining module, configured to determine a first parameter used to generate the pilot sequence in a first parameter candidate set, where the first parameter candidate set includes at least two timeslot numbers of the following timeslot numbers: a timeslot number obtained after downlink synchronization, a predefined timeslot number, timeslot numbers in a second type pilot configuration parameter, a timeslot number obtained from a high layer notification, and a timeslot number obtained from a dynamic notification, where a second type pilot is different from a pilot corresponding to the pilot sequence; and a processing module, configured to generate the pilot sequence according to the first parameter determined by the first determining module.

In yet another aspect, an embodiment of the present invention provides a base station, where the base station includes: a first determining module, configured to determine a first parameter used to generate the pilot sequence in a first parameter candidate set, where the first parameter candidate set includes at least two timeslot numbers of the following timeslot numbers: a downlink timeslot number of a primary serving cell, a predefined timeslot number, timeslot numbers in a second type pilot configuration parameter, and a timeslot number additionally configured by a network side, where a second type pilot is different from a pilot corresponding to the pilot sequence; and a processing module, configured to generate the pilot sequence according to the first parameter determined by the first determining module.

In yet another aspect, an embodiment of the present invention provides a communication device, where the communication device includes: a determining module, configured to determine, according to a currently scheduled rank, a second parameter used to generate the pilot sequence, where the second parameter represents a virtual identifier ID; and a processing module, configured to generate the pilot sequence according to the second parameter determined by the determining module.

Based on the above technical solutions, in the method, user equipment, and base station for generating a pilot sequence according to the embodiments of the present invention, by determining a first parameter used to generate the pilot sequence in a first parameter candidate set, orthogonal pairing between users under asynchronous cells can be supported, thereby reducing interferences and improving channel estimation performance and detection performance.

BRIEF DESCRIPTION OF DRAWINGS

To describe the technical solutions in the embodiments of the present invention more clearly, the following briefly introduces accompanying drawings required for describing the embodiments of the present invention. Apparently, the accompanying drawings in the following description show merely some embodiments of the present invention, and persons of ordinary skill in the art may still derive other drawings according to these accompanying drawings without creative efforts.

FIG. 1 is a schematic flowchart of a method for generating a pilot sequence according to an embodiment of the present invention;

FIG. 2 is another schematic flowchart of a method for generating a pilot sequence according to an embodiment of the present invention;

DESCRIPTION OF EMBODIMENTS

Figure 3:
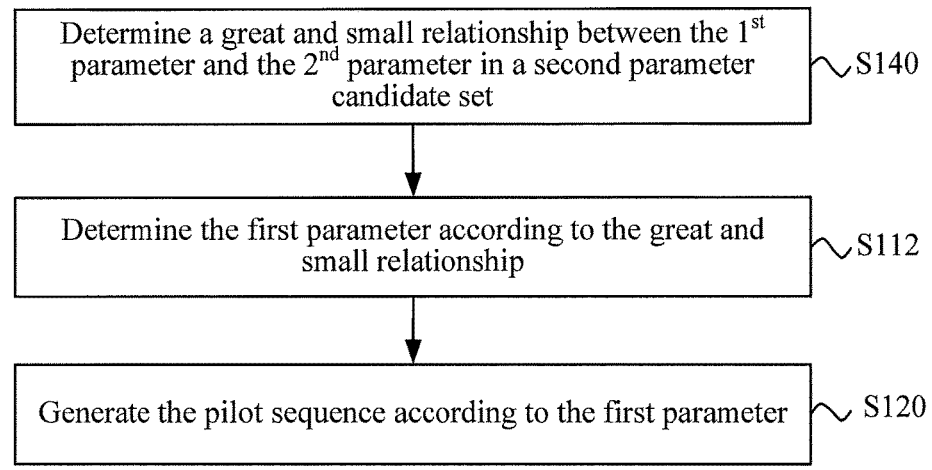
FIG. 3 is still another schematic flowchart of a method for generating a pilot sequence according to an embodiment of the present invention.

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

It should be understood that, the technical solutions of the embodiments of the present invention can be applied in various communications systems, such as a global system for mobile communications ("GSM" for short) system, a code division multiple access ("CDMA" for short) system, a wideband code division multiple access ("WCDMA" for short) system, a general packet radio service ("GPRS" for short), a long term evolution ("LTE" for short) system, an LTE frequency division duplex ("FDD" for short) system, LTE time division duplex ("TDD" for short), a universal mobile telecommunication system ("UMTS" for short), and a worldwide interoperability for microwave access ("Wi-MAX" for short) communication system.

It should be further understood that in the embodiments of the present invention, a user equipment ("UE" for short) may be referred to as a terminal, a mobile station ("MS" for short), or a mobile terminal. The user equipment can communicate with one or more core networks through a radio access network ("RAN" for short). For example, the user equipment may be a mobile phone (or be referred to as a "cellular" phone) or a computer having a mobile terminal, or may also be a portable, pocket-sized, hand-held, computer built-in, or vehicle-mounted mobile apparatus, which exchanges voice and/or data with the radio access network.

In the embodiments of the present invention, a base station may be a base station ("BTS" for short) in GSM or CDMA, may also be a base station (NodeB, "NB" for short) in WCDMA, and may also be an evolved base station ("ENB or e-NodeB" for short) in LTE, which is not limited in the present invention. For ease of description, the following embodiments are described by taking a base station ENB and a user equipment UE as an example.

FIG. 1 is a schematic flowchart of a method 100 for generating a pilot sequence according to an embodiment of the present invention. As shown in FIG. 1, the method 100 includes:

S110: Determine a first parameter used to generate the pilot sequence in a first parameter candidate set, where the first parameter candidate set includes at least two timeslot numbers of the following timeslot numbers: a timeslot number obtained after downlink synchronization, a predefined timeslot number, timeslot numbers in a second type pilot configuration parameter, a timeslot number obtained from a high layer notification, and a timeslot number obtained from a dynamic notification, where a second type pilot is different from a pilot corresponding to the pilot sequence.

S120: Generate the pilot sequence according to the first parameter.

In the embodiment of the present invention, the first parameter used by a user equipment to generate a pilot sequence is not determined by directly using a timeslot number for downlink synchronization, but is determined in the first parameter candidate set, so the first parameter is no longer affected by asynchronous timeslots of cells. In this way, even if timeslots of two cells are asynchronous, orthogonal pairing between users in the two cells can also be implemented by configuring the same first parameter.

Therefore, in the method for generating a pilot sequence according to the embodiment of the present invention, by determining the first parameter used to generate the pilot sequence in the first parameter candidate set, orthogonal pairing between users under asynchronous cells can be implemented, thereby reducing interferences and improving channel estimation performance and detection performance.

In the embodiment of the present invention, the first parameter, and a second parameter and a third parameter mentioned below are parameters generating an initial value of the pilot sequence. For example, the first parameter is a timeslot number $n_s$, the second parameter is a virtual identifier X, and the third parameter is a scrambling code identifier $n_{SCID}$, which may generate the initial value of the pilot sequence in a form of equation (1), or may also generate the initial value of the pilot sequence in another form, for example, a derivative form of equation (1), which is not limited in the embodiment of the present invention.

In S110, the user equipment determines the first parameter used to generate the pilot sequence in the first parameter candidate set.

In the embodiment of the present invention, the first parameter candidate set represents possible selection of the first parameter when the first parameter is determined. For example, in a certain scenario, the first parameter has two optional values, and the two optional values form the first parameter candidate set.

In the embodiment of the present invention, as shown in FIG. 2, optionally, the method 100 further includes:

S130: Determine a second parameter used to generate the pilot sequence in a second parameter candidate set;

where S110 includes:

S111: Determine the first parameter according to the second parameter.

The user equipment first determines the second parameter used to generate the pilot sequence, and then determines the first parameter according to a value of the second parameter. Optionally, S111 includes:

If the second parameter is the $1^{st}$ parameter in the second parameter candidate set, determine that the first parameter is the timeslot number obtained after downlink synchronization; and if the second parameter is the $2^{nd}$ parameter in the second parameter candidate set, determine that the first parameter is the predefined timeslot number, or the timeslot number obtained from the high layer notification, or the timeslot number obtained from the dynamic notification.

For example, the second parameter candidate set configured by the base station for the user equipment has two values X(0) and X(1). After the user equipment determines the second parameter, if the second parameter is the $1^{st}$ parameter X(0) in the second parameter candidate set, the user equipment adopts the timeslot number obtained after downlink synchronization as the first parameter; if the second parameter is the $2^{nd}$ parameter X(1) in the second parameter candidate set, the user equipment adopts the predefined timeslot number as the first parameter. The predefined timeslot number may be respectively preconfigured on a base station side and a user equipment side, for example, is directly specified on the base station and the user equipment. Optionally, if the second parameter is the $2^{nd}$ parameter X(1) in the second parameter candidate set, the timeslot number obtained from the high layer notification or the timeslot number obtained from the dynamic notification may also be adopted as the first parameter. In the embodiment of the present invention, a specific notification manner is not limited, for example, an offset value relative to the timeslot number for the downlink synchronization may be notified, or the selected timeslot number may also be directly notified. Therefore, in the embodiment of the present invention, the timeslot number obtained from the high layer notification includes a timeslot number directly notified by a high layer, or a sum of the timeslot number obtained after downlink synchronization and a timeslot offset value notified by the high layer; and the timeslot number obtained from the dynamic notification includes a dynamically and directly notified timeslot number, or a sum of the timeslot number obtained after downlink synchronization and a dynamically notified timeslot offset value.

It should be understood that each specific implementation manner of the embodiment of the present invention has an equivalent replacement manner. For example, the foregoing implementation manner may be equivalently replaced as follows:

if the second parameter is the $2^{nd}$ parameter in the second parameter candidate set, determine that the first parameter is the timeslot number obtained after downlink synchronization; and if the second parameter is the $1^{st}$ parameter in the second parameter candidate set, determine that the first parameter is the predefined timeslot number, or the timeslot number obtained from the high layer notification, or the timeslot number obtained from the dynamic notification.

The equivalent replacement manner should fall within the protection scope of the present invention.

Optionally, S111 includes:

if the second parameter is the $1^{st}$ parameter in the second parameter candidate set, determine that the first parameter is the timeslot number obtained after downlink synchronization performed according to a first configuration resource in second type pilot configuration; and if the second parameter is the $2^{nd}$ parameter in the second parameter candidate set, determine that the first parameter is the timeslot number obtained after downlink synchronization performed according to a second configuration resource in the second type pilot configuration.

In the embodiment of the present invention, the second type pilot is a pilot different from the pilot. For example, the second type pilot may be a channel state information reference signal ("CSI-RS" for short). The second type pilot configuration parameter has multiple timeslot numbers, which means that different resource configurations in the second type pilot configuration correspond to different timeslot numbers for downlink synchronization. If the second parameter is X(0), the user equipment adopts the timeslot number obtained after downlink synchronization performed according to the first configuration resource in the second type pilot configuration as the first parameter; and if the second parameter is X(1), the user equipment adopts the timeslot number obtained after downlink synchronization performed according to the second configuration resource in the second type pilot configuration as the first parameter.

Optionally, S111 includes:

if the second parameter is a cell ID, determine that the first parameter is the timeslot number obtained after downlink synchronization; and if the second parameter is not the cell ID, determine that the first parameter is the predefined timeslot number, or the timeslot number obtained from the high layer notification, or the timeslot number obtained from the dynamic notification.

After determining the second parameter, the user equipment may determine, according to a relationship between the second parameter and the cell ID, the first parameter. If the second parameter is the cell ID, the timeslot number obtained after downlink synchronization is adopted as the first parameter; and if the second parameter is not the cell ID, the predefined timeslot number, or the timeslot number obtained from the high layer notification, or the timeslot number obtained from the dynamic notification is adopted as the first parameter. For a specific predefinition manner and a specific notification manner, reference may be made to the above-mentioned embodiment, and description is not given herein.

Optionally, S111 includes:

if the second parameter is a cell ID, determine that the first parameter is the timeslot number obtained after downlink synchronization performed according to a first configuration resource in second type pilot configuration; and if the second parameter is not the cell ID, determine that the first parameter is the timeslot number obtained after downlink synchronization performed according to a second configuration resource in the second type pilot configuration.

That is to say, if the second parameter is the cell ID, the user equipment adopts the timeslot number obtained after downlink synchronization performed according to the first configuration resource in the second type pilot configuration as the first parameter; and if the second parameter is not the cell ID, the user equipment adopts the timeslot number obtained after downlink synchronization performed according to the second configuration resource in the second type pilot configuration as the first parameter.

In the embodiment of the present invention, there may be another manner of determining the first parameter according to the relationship between the second parameter and the cell ID, for example:

if the second parameter is smaller than or equal to a cell ID, determine that the first parameter is the timeslot number obtained after downlink synchronization; and if the second parameter is greater than the cell ID, determine that the first parameter is the predefined timeslot number, or the timeslot number obtained from the high layer notification, or the timeslot number obtained from the dynamic notification; or if the second parameter is smaller than or equal to a cell ID, determine that the first parameter is the timeslot number obtained after downlink synchronization performed according to a first configuration resource in second type pilot configuration; and if the second parameter is greater than the cell ID, determine that the first parameter is the timeslot number obtained after downlink synchronization performed according to a second configuration resource in the second type pilot configuration.

For specific implementation manners of these manners, reference may be made to the above-mentioned embodiment. For brevity, no description is given herein.

In the embodiment of the present invention, as shown in FIG. 3, optionally, the method 100 further includes:

S140: Determine a great and small relationship between the $1^{st}$ parameter and the $2^{nd}$ parameter in the second parameter candidate set;

where S110 includes:

S112: Determine the first parameter according to the great and small relationship.

The second parameter candidate set includes at least two virtual IDs. The user equipment determines the first parameter according to the great and small relationship between the $1^{st}$ parameter and the $2^{nd}$ parameter in the second parameter candidate set.

Optionally, if the $1^{st}$ parameter is smaller than or equal to the $2^{nd}$ parameter, determine that the first parameter is the timeslot number obtained after downlink synchronization; and if the $1^{st}$ parameter is greater than the $2^{nd}$ parameter, determine that the first parameter is the predefined timeslot number, or the timeslot number obtained from the high layer notification, or the timeslot number obtained from the dynamic notification; or optionally, if the $1^{st}$ parameter is smaller than or equal to the $2^{nd}$ parameter, determine that the first parameter is the timeslot number obtained after downlink synchronization performed according to a first configuration resource in second type pilot configuration; and if the $1^{st}$ parameter is greater than the $2^{nd}$ parameter, determine that the first parameter is the timeslot number obtained after downlink synchronization performed according to a second configuration resource in the second type pilot configuration.

Figure 4:
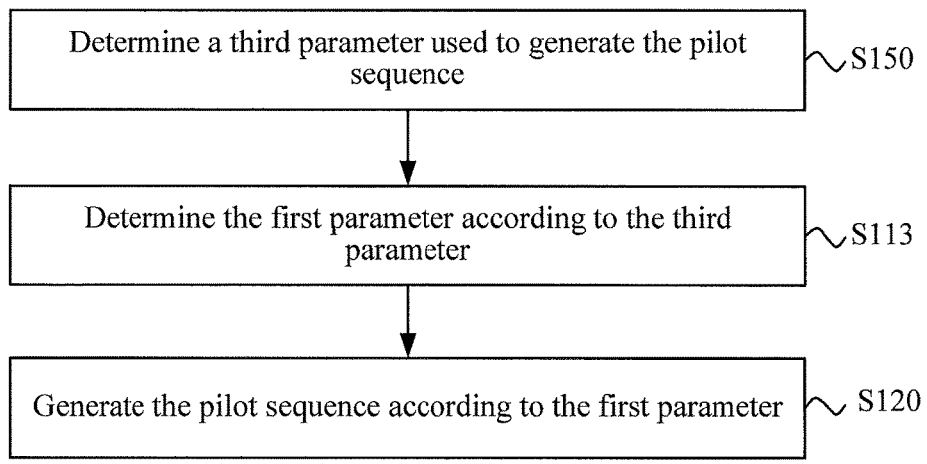
FIG. 4 is yet another schematic flowchart of a method for generating a pilot sequence according to an embodiment of the present invention.

In the embodiment of the present invention, as shown in FIG. 4, optionally, the method 100 further includes:

S150: Determine a third parameter used to generate the pilot sequence;

where S110 includes:

S113: Determine the first parameter according to the third parameter.

The user equipment firstly determines the third parameter used to generate the pilot sequence, and then determines the first parameter according to the third parameter. For example, by receiving a third parameter $n_{SCID}$ sent by the base station, the user equipment determines the first parameter according to a value of $n_{SCID}$.

Optionally, if the third parameter is 0, determine that the first parameter is the timeslot number obtained after downlink synchronization; and if the third parameter is 1, determine that the first parameter is the predefined timeslot number, or the timeslot number obtained from the high layer notification, or the timeslot number obtained from the dynamic notification.

Optionally, if the third parameter is 0, determine that the first parameter is the timeslot number obtained after downlink synchronization performed according to a first configuration resource in second type pilot configuration; and if the third parameter is 1, determine that the first parameter is the timeslot number obtained after downlink synchronization performed according to a second configuration resource in the second type pilot configuration.

Optionally, if the third parameter is 0, determine that the second parameter used to generate the pilot sequence is the $1^{st}$ parameter in the second parameter candidate set, and determine that the first parameter is the timeslot number obtained after downlink synchronization; and if the third parameter is 1, determine that the second parameter is the $2^{nd}$ parameter in the second parameter candidate set, and determine that the first parameter is the predefined timeslot number, or the timeslot number obtained from the high layer notification, or the timeslot number obtained from the dynamic notification.

Optionally, if the third parameter is 0, determine that the second parameter is the $1^{st}$ parameter in the second parameter candidate set, and determine that the first parameter is the timeslot number obtained after downlink synchronization performed according to a first configuration resource in second type pilot configuration; and if the third parameter is 1, determine that the second parameter is the $2^{nd}$ parameter in the second parameter candidate set, and determine that the first parameter is the timeslot number obtained after downlink synchronization performed according to a second configuration resource in the second type pilot configuration.

In the embodiment of the present invention, optionally, S110 includes:

S114: Determine, according to dynamic or semi-static signaling sent by a base station, the first parameter in the timeslot numbers in the second type pilot configuration parameter.

The user equipment receives the dynamic or semi-static signaling sent by the base station, and selects, according to the signaling, the timeslot number in the second type pilot configuration parameter as the first parameter. For example, a set of the timeslot numbers in the second type pilot configuration parameter may be used as the first parameter candidate set, from which the user equipment makes selection according to the signaling from the base station.

In the embodiment of the present invention, optionally, S110 includes:

S115: Determine the first parameter according to a currently scheduled rank.

Optionally, if the currently scheduled rank is not greater than a preset value, determine that the first parameter is the timeslot number obtained after downlink synchronization; and if the rank is greater than the preset value, determine that the first parameter is the predefined timeslot number, or the timeslot number obtained from the high layer notification, or the timeslot number obtained from the dynamic notification.

Optionally, if the rank is not greater than a preset value, determine that the first parameter is the timeslot number obtained after downlink synchronization performed according to a first configuration resource in second type pilot configuration; and if the rank is greater than the preset value, determine that the first parameter is the timeslot number obtained after downlink synchronization performed according to a second configuration resource in the second type pilot configuration.

In S120, the user equipment generates the pilot sequence according to the first parameter.

Specifically, the user equipment first determines, according to the first parameter, and the second parameter and the third parameter which are used to generate the pilot sequence, an initial value of the pilot sequence, and then determines the pilot sequence according to the initial value. For example, the user equipment may generate $c_{init}$ according to equation (1), and then generate the pilot sequence according to $c_{init}$. The first parameter is no longer affected by asynchronous timeslots of cells, so the finally obtained pilot sequence is not affected by the asynchronous timeslots of the cells.

Therefore, in the method for generating a pilot sequence according to the embodiment of the present invention, by determining a first parameter used to generate a pilot sequence in a first parameter candidate set, orthogonal pairing between users under asynchronous cells can be implemented, thereby reducing interferences and improving channel estimation performance and detection performance.

The method for generating a pilot sequence is hereinbefore described from the perspective of a user equipment with reference to FIG. 1 to FIG. 4. The method for generating a pilot sequence is hereinafter described from the perspective of a base station with reference to FIG. 5 to FIG. 8.

Figure 5:
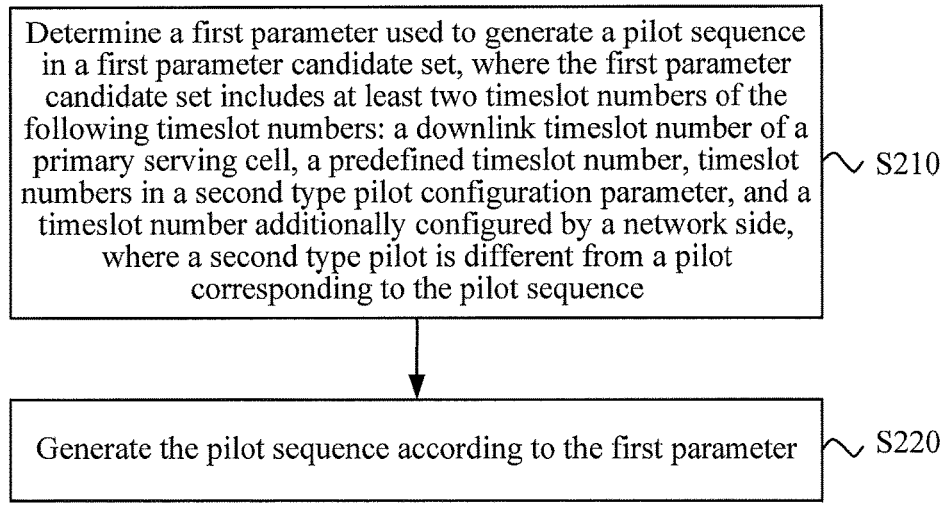
FIG. 5 is a schematic flowchart of a method for generating a pilot sequence according to another embodiment of the present invention.

FIG. 5 is a schematic flowchart of a method 200 for generating a pilot sequence according to another embodiment of the present invention. As shown in FIG. 5, the method 200 includes:

S210: Determine a first parameter used to generate the pilot sequence in a first parameter candidate set, where the first parameter candidate set includes at least two timeslot numbers of the following timeslot numbers: a downlink timeslot number of a primary serving cell, a predefined timeslot number, timeslot numbers in a second type pilot configuration parameter, and a timeslot number additionally configured by a network side, where a second type pilot is different from a pilot corresponding to the pilot sequence.

S220: Generate the pilot sequence according to the first parameter.

Therefore, in the method for generating a pilot sequence according to the embodiment of the present invention, by determining the first parameter used to generate the pilot sequence in the first parameter candidate set, orthogonal pairing between users under asynchronous cells can be implemented, thereby reducing interferences and improving channel estimation performance and detection performance.

In S210, a base station determines the first parameter used to generate the pilot sequence corresponding to a user equipment in the first parameter candidate set.

Figure 6:
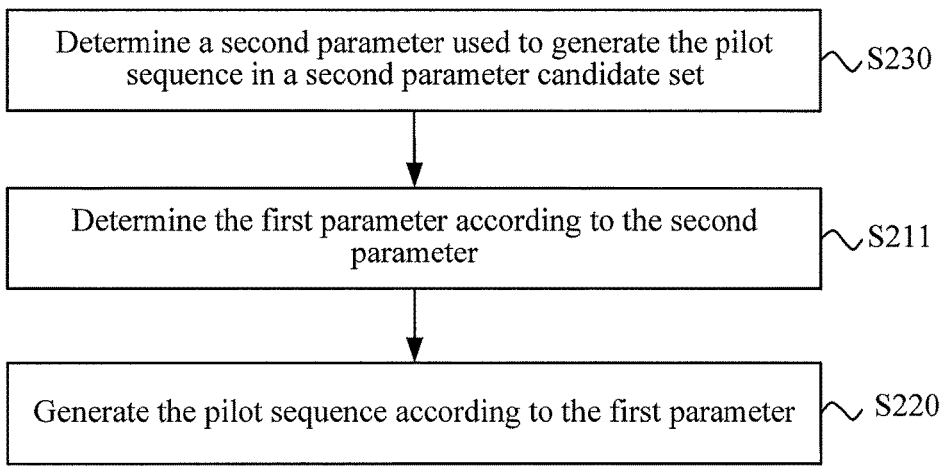
FIG. 6 is another schematic flowchart of a method for generating a pilot sequence according to another embodiment of the present invention.

In the embodiment of the present invention, as shown in FIG. 6, optionally, the method 200 further includes:

S230: Determine a second parameter used to generate the pilot sequence in a second parameter candidate set;

where S210 includes:

S211: Determine the first parameter according to the second parameter.

The base station first determines the second parameter used to generate the pilot sequence, and then determines the first parameter according to the second parameter. Optionally, S211 includes:

if the second parameter is the $1^{st}$ parameter in the second parameter candidate set, determine that the first parameter is the downlink timeslot number; and if the second parameter is the $2^{nd}$ parameter in the second parameter candidate set, determine that the first parameter is the predefined timeslot number or the additionally configured timeslot number.

For example, the second parameter candidate set configured by the base station for the user equipment has two values X(0) and X(1). After determining which value in the set is the second parameter, the base station determines the first parameter according to the second parameter. If the second parameter is the $1^{st}$ parameter X(0) in the second parameter candidate set, the timeslot number obtained after downlink synchronization is adopted as the first parameter; and if the second parameter is the $2^{nd}$ parameter X(1) in the second parameter candidate set, the predefined timeslot number is adopted as the first parameter. Alternatively, optionally, if the second parameter is the $2^{nd}$ parameter X(1) in the second parameter candidate set, the additionally configured timeslot number may also be adopted as the first parameter.

If adopting the additionally configured timeslot number, the base station notifies the user equipment in a manner of the high layer notification or the dynamic notification.

Optionally, the base station may directly notify the user equipment of the additionally configured timeslot number, or may also notify the user equipment of the additionally configured timeslot number and a timeslot offset value of the timeslot number for the downlink synchronization, so that the user equipment obtains the additionally configured timeslot number.

Optionally, S211 includes:

if the second parameter is the $1^{st}$ parameter in the second parameter candidate set, determine that the first parameter is the timeslot number obtained after downlink synchronization performed according to a first configuration resource in second type pilot configuration; and if the second parameter is the $2^{nd}$ parameter in the second parameter candidate set, determine that the first parameter is the timeslot number obtained after downlink synchronization performed according to a second configuration resource in the second type pilot configuration.

Optionally, S211 includes:

if the second parameter is a cell ID, determine that the first parameter is the downlink timeslot number; and if the second parameter is not the cell ID, determine that the first parameter is the predefined timeslot number or the additionally configured timeslot number.

After determining the second parameter, the user equipment may determine, according to a relationship between the second parameter and the cell ID, the first parameter. There may be multiple determination manners, for example:

if the second parameter is a cell ID, determine that the first parameter is the timeslot number obtained after downlink synchronization performed according to a first configuration resource in second type pilot configuration; and if the second parameter is not the cell ID, determine that the first parameter is the timeslot number obtained after downlink synchronization performed according to a second configuration resource in the second type pilot configuration; or if the second parameter is smaller than or equal to a cell ID, determine that the first parameter is the downlink timeslot number; and if the second parameter is greater than a cell ID, determine that the first parameter is the predefined timeslot number or the additionally configured timeslot number; or if the second parameter is smaller than or equal to a cell ID, determine that the first parameter is the timeslot number obtained after downlink synchronization performed according to a first configuration resource in second type pilot configuration; and if the second parameter is greater than a cell ID, determine that the first parameter is the timeslot number obtained after downlink synchronization performed according to a second configuration resource in the second type pilot configuration.

Figure 7:
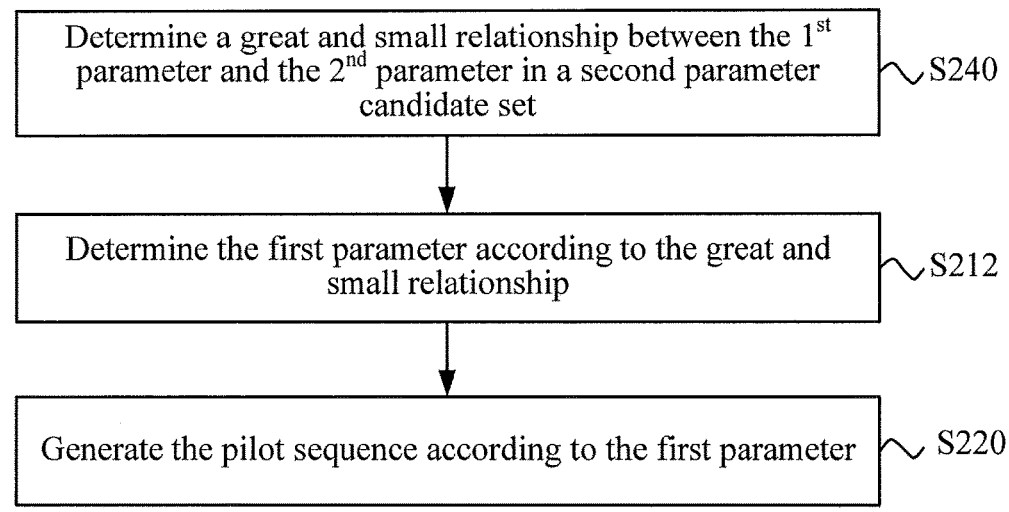
FIG. 7 is still another schematic flowchart of a method for generating a pilot sequence according to another embodiment of the present invention.

In the embodiment of the present invention, as shown in FIG. 7, optionally, the method 200 further includes:

S240: Determine a great and small relationship between the $1^{st}$ parameter and the $2^{nd}$ parameter in the second parameter candidate set;

where S210 includes:

S212: Determine the first parameter according to the great and small relationship.

The second parameter candidate set includes at least two virtual IDs. The base station determines the first parameter according to the great and small relationship between the $1^{st}$ parameter and the $2^{nd}$ parameter in the second parameter candidate set.

Optionally, if the $1^{st}$ parameter is smaller than or equal to the $2^{nd}$ parameter, determine that the first parameter is the downlink timeslot number; and if the $1^{st}$ parameter is greater than the $2^{nd}$ parameter, determine that the first parameter is the predefined timeslot number or the additionally configured timeslot number; or optionally, if the $1^{st}$ parameter is smaller than or equal to the $2^{nd}$ parameter, determine that the first parameter is the timeslot number obtained after downlink synchronization performed according to a first configuration resource in second type pilot configuration; and if the $1^{st}$ parameter is greater than the $2^{nd}$ parameter, determine that the first parameter is the timeslot number obtained after downlink synchronization performed according to a second configuration resource in the second type pilot configuration.

Figure 8:
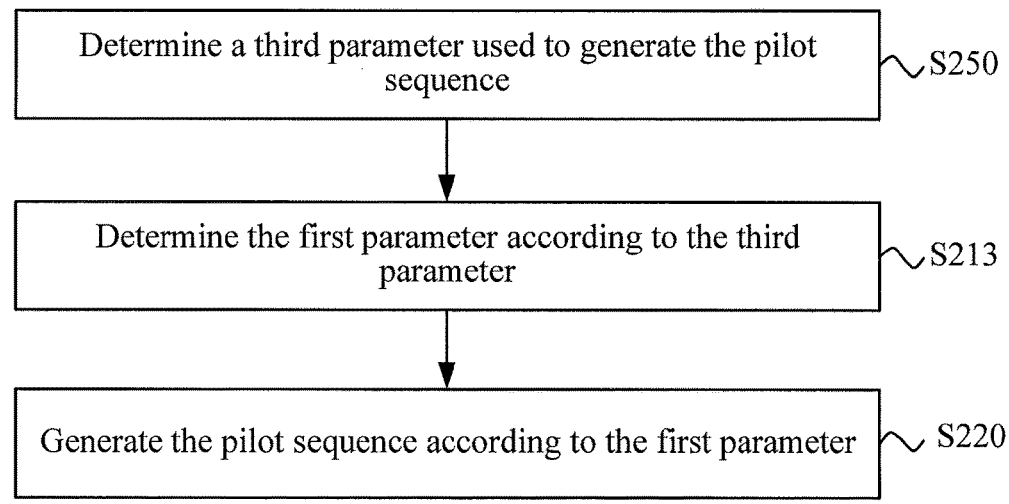
FIG. 8 is yet another schematic flowchart of a method for generating a pilot sequence according to another embodiment of the present invention.

In the embodiment of the present invention, as shown in FIG. 8, optionally, the method 200 further includes:

S250: Determine a third parameter used to generate the pilot sequence;

where S210 includes:

S213: Determine the first parameter according to the third parameter.

The base station firstly determines the third parameter used to generate the pilot sequence, and then determines the first parameter according to the third parameter. For example, the base station determines the first parameter according to a value of a scrambling code identifier $n_{SCID}$.

Optionally, if the third parameter is 0, determine that the first parameter is the downlink timeslot number; and if the third parameter is 1, determine that the first parameter is the predefined timeslot number or the additionally configured timeslot number.

Optionally, if the third parameter is 0, determine that the first parameter is the timeslot number obtained after downlink synchronization performed according to a first configuration resource in second type pilot configuration; and if the third parameter is 1, determine that the first parameter is the timeslot number obtained after downlink synchronization performed according to a second configuration resource in the second type pilot configuration.

Optionally, if the third parameter is 0, determine that the second parameter used to generate the pilot sequence is the $1^{st}$ parameter in the second parameter candidate set, and determine that the first parameter is the downlink timeslot number; and if the third parameter is 1, determine that the second parameter is the $2^{nd}$ parameter in the second parameter candidate set, and determine that the first parameter is the predefined timeslot number or the additionally configured timeslot number.

Optionally, if the third parameter is 0, determine that the second parameter is the $1^{st}$ parameter in the second parameter candidate set, and determine that the first parameter is the timeslot number obtained after downlink synchronization performed according to a first configuration resource in second type pilot configuration; and if the third parameter is 1, determine that the second parameter is the $2^{nd}$ parameter in the second parameter candidate set, and determine that the first parameter is the timeslot number obtained after downlink synchronization performed according to a second configuration resource in the second type pilot configuration.

In the embodiment of the present invention, optionally, S210 includes:

S214: Determine the first parameter in the timeslot numbers in the second type pilot configuration parameter.

The base station selects one timeslot number in a set of the timeslot numbers in the second type pilot configuration parameter as the first parameter, and then sends dynamic or semi-static signaling to the user equipment, so that the user equipment determines the first parameter according to the signaling.

In the embodiment of the present invention, optionally, S210 includes:

S215: Determine the first parameter according to a currently scheduled rank.

Optionally, if the currently scheduled rank is not greater than a preset value, determine that the first parameter is the downlink timeslot number; and if the rank is greater than the preset value, determine that the first parameter is the predefined timeslot number or the additionally configured timeslot number.

Optionally, if the rank is not greater than a preset value, determine that the first parameter is the timeslot number obtained after downlink synchronization performed according to a first configuration resource in second type pilot configuration; and if the rank is greater than the preset value, determine that the first parameter is the timeslot number obtained after downlink synchronization performed according to a second configuration resource in the second type pilot configuration.

In S220, the base station generates the pilot sequence according to the first parameter.

Specifically, the base station first determines, according to the first parameter, and the second parameter and the third parameter which are used to generate the pilot sequence, an initial value of the pilot sequence, and then determines the pilot sequence according to the initial value. For example, the user equipment may generate $c_{init}$ according to equation (1), and then generate the pilot sequence according to $c_{init}$. The first parameter is no longer affected by asynchronous timeslots of cells, so the finally obtained pilot sequence is not affected by the asynchronous timeslots of the cells.

It should be understood that in the embodiment of the present invention, interaction between the base station and the user equipment, relevant characteristics, and functions described from the perspective of the user equipment side correspond to the descriptions from the perspective of the base station side. For brevity, description is not given herein.

The following describes the method for generating a pilot sequence according to the embodiment of the present invention in more detail with reference to specific examples. It should be noted that the examples are only used to help persons skilled in the art to understand some possible implementation manners of the present invention, instead of exhaustively listing all the implementation manners, so the examples cannot be understood as the limitation to the scope of the present invention.

Figure 9:
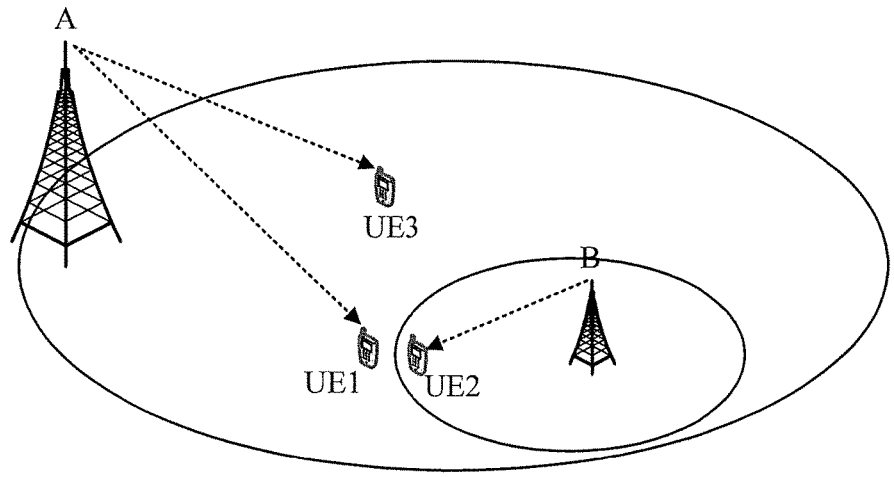
FIG. 9 is a schematic diagram of an application scenario according to an embodiment of the present invention.

For example, in a scenario shown in FIG. 9, timeslots of a cell A and a cell B are not synchronous, that is, at a certain moment, the timeslot number of the cell A is $n_{sA}$, and the timeslot number of the cell B is $n_{sB}$. When orthogonal pairing between an edge user UE1 of the cell A and an edge user UE2 of the cell B is to be implemented, the base station selects, according to a current scenario, a second parameter $X_c$ different from an ID of the cell A for the UE1, then selects a predefined value as a first parameter $n_{sc}$, selects the second parameter $X_c$ different from an ID of the cell B for the UE2, and then selects the predefined value as the first parameter $n_{sc}$. In this manner, by configuring the same second parameters $X_c$ and the same first parameters $n_{sc}$, orthogonal pairing is implemented between the UE1 and the UE2. If in the current scenario, the orthogonal pairing between the UE1 and the UE2 is not required, but orthogonal pairing between the UE1 and a UE3 is required, the base station selects the ID of the cell A as the second parameter $X_A$ of the UE1 for the UE1, then selects a timeslot number of the cell A as the first parameter $n_{sA}$, selects the ID of the cell A as a second parameter $X_A$ of the UE3 for the UE3, and then selects the timeslot number of the cell A as the first parameter $n_{sA}$, so as to implement the orthogonal pairing between the UE1 and the UE3. Therefore, the method for generating a pilot sequence according to the embodiment of the present invention can not only implement orthogonal pairing between users in one asynchronous cell, but also implement orthogonal pairing between users between asynchronous cells.

Therefore, in the method for generating a pilot sequence according to the embodiment of the present invention, by determining a first parameter used to generate a pilot sequence in a first parameter candidate set, orthogonal pairing between users under asynchronous cells can be implemented, thereby reducing interferences and improving channel estimation performance and detection performance.

Figure 10:
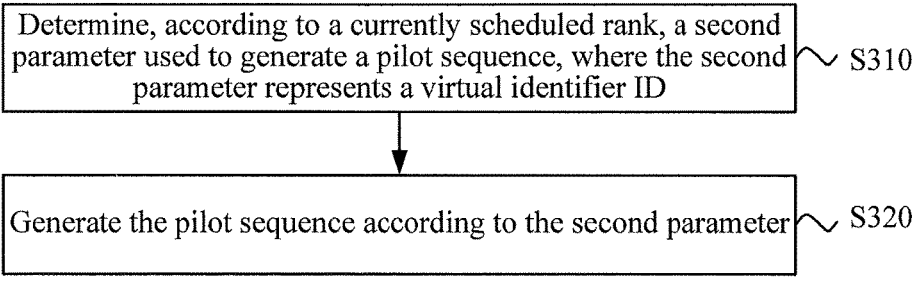
FIG. 10 is a schematic flowchart of a method for generating a pilot sequence according to still another embodiment of the present invention.

FIG. 10 is a schematic flowchart of a method 300 for generating a pilot sequence according to still another embodiment of the present invention. As shown in FIG. 10, the method 300 includes:

S310: Determine, according to a currently scheduled rank, a second parameter used to generate the pilot sequence, where the second parameter represents a virtual identifier ID.

S320: Generate the pilot sequence according to the second parameter.

Currently, selection of the second parameter used to generate the pilot sequence depends on a scrambling code identifier $n_{SCID}$. When a rank rank is 1 or 2, $n_{SCID}$ has two values (0 or 1). However, when the rank is greater than or equal to 3, $n_{SCID}$ only has one value, so the second parameter cannot be dynamically selected.

In the embodiment of the present invention, a communication device executing the method 300 may be a base station or may also be a device. For brevity, description is given by taking the user equipment as an example.

In the embodiment of the present invention, the user equipment determines, according to the currently scheduled rank, the second parameter used to generate the pilot sequence, so that the second parameter can be dynamically selected at a high rank scheduling moment.

Figure 11:
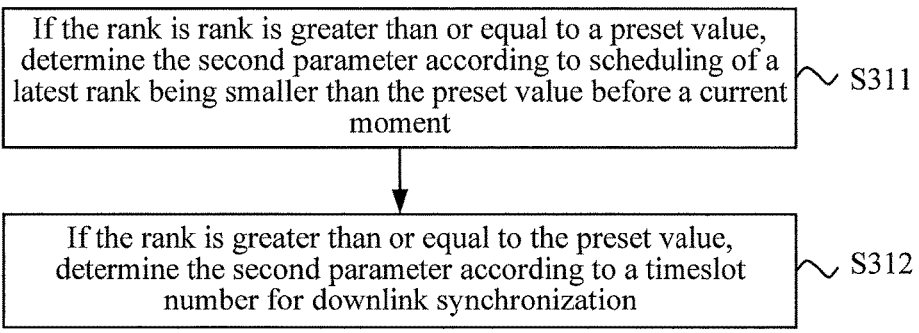
FIG. 11 is a schematic flowchart of a method for determining a second parameter according to still another embodiment of the present invention.

As shown in FIG. 11, optionally, S310 includes:

S311: If the rank is greater than or equal to a preset value, determine the second parameter according to scheduling of a latest rank being smaller than the preset value before a current moment.

When the scheduled rank is greater than or equal to the preset value, the user equipment determines the second parameter according to scheduling information of the latest rank being smaller than the preset value.

Optionally, the user equipment determines the second parameter according to a scrambling code ID in the scheduling information of the latest rank being smaller than the preset value. When the rank is low, the scrambling code ID may have two values, thereby improving degree of free selection.

Optionally, the user equipment determines that the second parameter is a second parameter adopted for scheduling of the latest rank being smaller than the preset value. That is to say, the second parameter adopted when the latest rank is smaller than the preset value is directly adopted. When the rank is low, the adopted second parameter may also have two options, thereby improving the degree of free selection of the second parameter.

Figure 12:
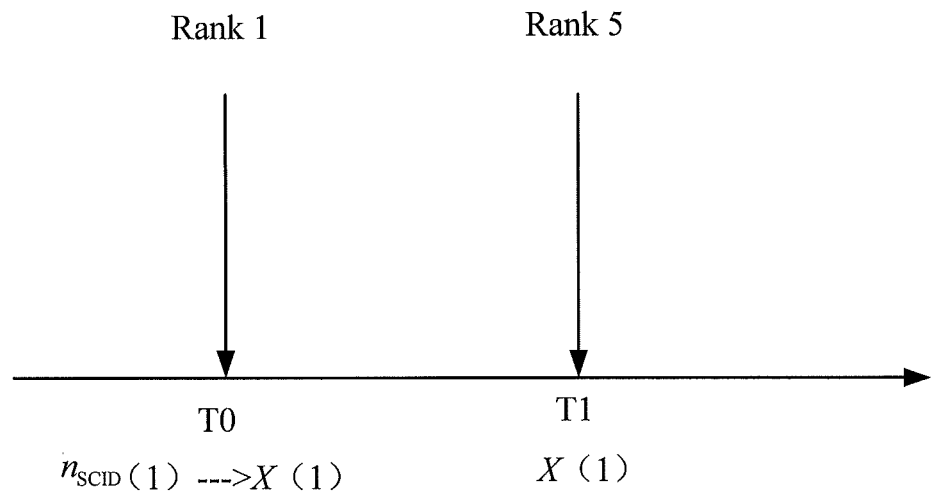
FIG. 12 is a schematic diagram of a method for generating a pilot sequence according to still another embodiment of the present invention.

For example, as shown in FIG. 12, a preset value is 3; at a T0 moment, a scheduled rank is 1, $n_{SCID}$ is configured to be 1, and a selected second parameter is X(1); at a T1 moment, a scheduled rank is 5 and greater than the preset value, and the second parameter X(1) selected at the T0 moment is used. If at the T0 moment, $n_{SCID}$ is configured to be 0, and a selected second parameter is X(0), at the T1 moment, the second parameter X(1) selected at the T0 moment is used. In this way, the value of the second parameter at the T1 moment is no longer only one value, which improves the degree of free selection of the second parameter and facilitates interference coordination.

In the embodiment of the present invention, as shown in FIG. 11, optionally, S310 includes:

S312: If the rank is greater than or equal to the preset value, determine the second parameter according to a timeslot number for downlink synchronization.

When the scheduled rank is greater than or equal to the preset value, the user equipment determines the second parameter according to the timeslot number for downlink synchronization.

Optionally, the user equipment determines the second parameter according to the timeslot number for downlink synchronization, and correspondence between the timeslot number and the second parameter. Optionally, the base station and the user equipment may pre-establish correspondence between the timeslot number and the parameter in the second parameter candidate set. For example, timeslot numbers 1, 3, 5, 7 correspond to X(0) in the second parameter candidate set; and timeslot numbers 2, 4, 6, 8 correspond to X(1) in the second parameter candidate set. When the rank is high, the user equipment uses the second parameter corresponding to the timeslot number for downlink synchronization, which also improves the degree of free selection of the second parameter.

In S320, the user equipment generates the pilot sequence according to the second parameter. Specifically, the user equipment first determines an initial value of the pilot sequence according to the second parameter, and then determines the pilot sequence according to the initial value. For example, $c_{init}$ may be generated according to equation (1), and then the pilot sequence is generated according to $c_{init}$.

Therefore, in the method for generating a pilot sequence according to the embodiment of the present invention, a second parameter used to generate a pilot sequence is determined according to a currently scheduled rank, which improves degree of free selection of the second parameter and facilitates interference coordination.

It should be understood that in various embodiments of the present invention, sequence numbers of a process do not represent an order of execution, and the order of execution of a process should be determined according to the function and the inner logic. The sequence numbers herein shall not constitute any limitation on the implementation process of the embodiments of the present invention.

The method for generating a pilot sequence according to the embodiment of the present invention is described hereinbefore in detail with reference to FIG. 1 to FIG. 12. A user equipment and a base station according to the embodiments of the present invention are described hereinafter in detail with reference to FIG. 13 to FIG. 22.

Figure 13:
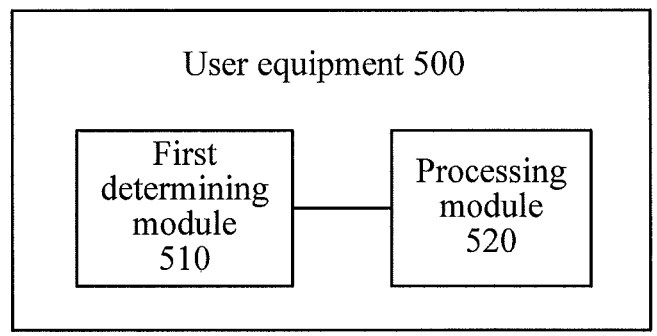
FIG. 13 is a schematic block diagram of a user equipment according to an embodiment of the present invention.

FIG. 13 is a schematic block diagram of a user equipment 500 according to an embodiment of the present invention. As shown in FIG. 13, the user equipment 500 includes:

a first determining module 510, configured to determine a first parameter used to generate the pilot sequence in a first parameter candidate set, where the first parameter candidate set includes at least two timeslot numbers of the following timeslot numbers: a timeslot number obtained after downlink synchronization, a predefined timeslot number, timeslot numbers in a second type pilot configuration parameter, a timeslot number obtained from a high layer notification, and a timeslot number obtained from a dynamic notification, where a second type pilot is different from a pilot corresponding to the pilot sequence; and a processing module 520, configured to generate the pilot sequence according to the first parameter determined by the first determining module 510.

In the user equipment according to the embodiment of the present invention, by determining the first parameter used to generate the pilot sequence in the first parameter candidate set, orthogonal pairing between users under asynchronous cells can be implemented, thereby reducing interferences and improving channel estimation performance and detection performance.

Figure 14:
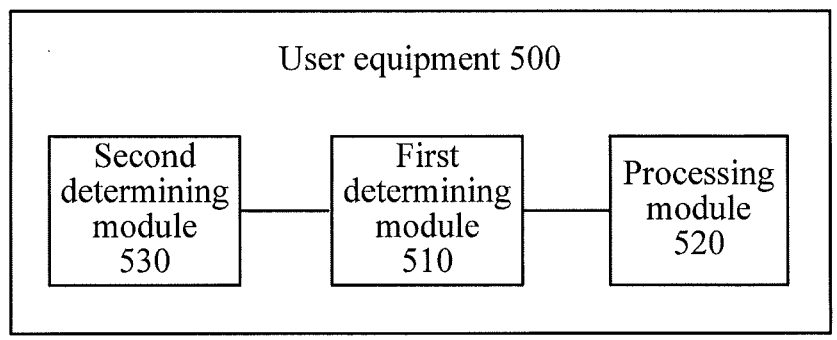
FIG. 14 is another schematic block diagram of a user equipment according to an embodiment of the present invention.

In the embodiment of the present invention, as shown in FIG. 14, optionally, the user equipment 500 further includes:

a second determining module 530, configured to determine a second parameter used to generate the pilot sequence in a second parameter candidate set;

where the first determining module 510 includes:

a first determining unit 511, configured to determine the first parameter according to the second parameter.

In the embodiment of the present invention, optionally, the first determining unit 511 includes:

a first determining subunit, configured to, if the second parameter is the $1^{st}$ parameter in the second parameter candidate set, determine that the first parameter is the timeslot number obtained after downlink synchronization; and if the second parameter is the $2^{nd}$ parameter in the second parameter candidate set, determine that the first parameter is the predefined timeslot number, or the timeslot number obtained from the high layer notification, or the timeslot number obtained from the dynamic notification.

Optionally, the first determining unit 511 includes:

a second determining subunit, configured to, if the second parameter is the $1^{st}$ parameter in the second parameter candidate set, determine that the first parameter is the timeslot number obtained after downlink synchronization performed according to a first configuration resource in second type pilot configuration; and if the second parameter is the $2^{nd}$ parameter in the second parameter candidate set, determine that the first parameter is the timeslot number obtained after downlink synchronization performed according to a second configuration resource in the second type pilot configuration.

Optionally, the first determining unit 511 includes:

a third determining subunit, configured to, if the second parameter is a cell ID, determine that the first parameter is the timeslot number obtained after downlink synchronization; and if the second parameter is not the cell ID, determine that the first parameter is the predefined timeslot number, or the timeslot number obtained from the high layer notification, or the timeslot number obtained from the dynamic notification.

Optionally, the first determining unit 511 includes:

a fourth determining subunit, configured to, if the second parameter is the cell ID, determine that the first parameter is the timeslot number obtained after downlink synchronization performed according to a first configuration resource in second type pilot configuration; and if the second parameter is not the cell ID, determine that the first parameter is the timeslot number obtained after downlink synchronization performed according to a second configuration resource in the second type pilot configuration.

Optionally, the first determining unit 511 includes:

a fifth determining subunit, configured to, if the second parameter is smaller than or equal to the cell ID, determine that the first parameter is the timeslot number obtained after downlink synchronization; and if the second parameter is greater than the cell ID, determine that the first parameter is the predefined timeslot number, or the timeslot number obtained from the high layer notification, or the timeslot number obtained from the dynamic notification.

Optionally, the first determining unit 511 includes:

a sixth determining subunit, configured to, if the second parameter is smaller than or equal to the cell ID, determine that the first parameter is the timeslot number obtained after downlink synchronization performed according to a first configuration resource in second type pilot configuration; and if the second parameter is greater than the cell ID, determine that the first parameter is the timeslot number obtained after downlink synchronization performed according to a second configuration resource in the second type pilot configuration.

Figure 15:
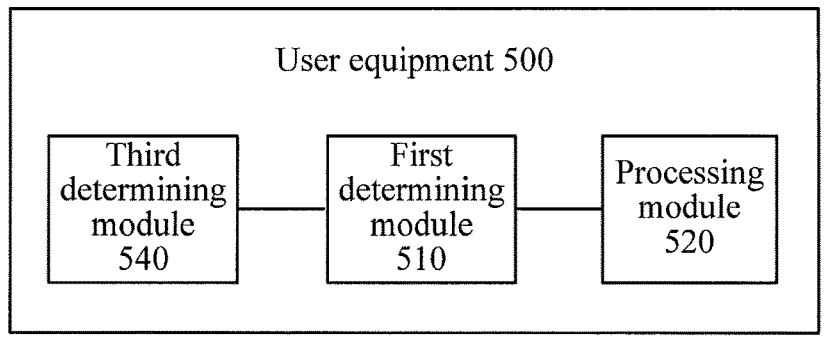
FIG. 15 is still another schematic block diagram of a user equipment according to an embodiment of the present invention.

In the embodiment of the present invention, as shown in FIG. 15, Optionally, the user equipment 500 further includes:

a third determining module 540, configured to determine a great and small relationship between the $1^{st}$ parameter and the $2^{nd}$ parameter in a second parameter candidate set;

where the first determining module 510 includes:

a second determining unit 512, configured to determine the first parameter according to the great and small relationship.

In the embodiment of the present invention, optionally, the second determining unit 512 includes:

a seventh determining subunit, configured to, if the $1^{st}$ parameter is smaller than or equal to the $2^{nd}$ parameter, determine that the first parameter is the timeslot number obtained after downlink synchronization; and if the $1^{st}$ parameter is greater than the $2^{nd}$ parameter, determine that the first parameter is the predefined timeslot number, or the timeslot number obtained from the high layer notification, or the timeslot number obtained from the dynamic notification.

Optionally, the second determining unit 512 includes:

an eighth determining subunit, configured to, if the $1^{st}$ parameter is smaller than or equal to the $2^{nd}$ parameter, determine that the first parameter is the timeslot number obtained after downlink synchronization performed according to a first configuration resource in second type pilot configuration; and if the $1^{st}$ parameter is greater than the $2^{nd}$ parameter, determine that the first parameter is the timeslot number obtained after downlink synchronization performed according to a second configuration resource in the second type pilot configuration.

Figure 16:
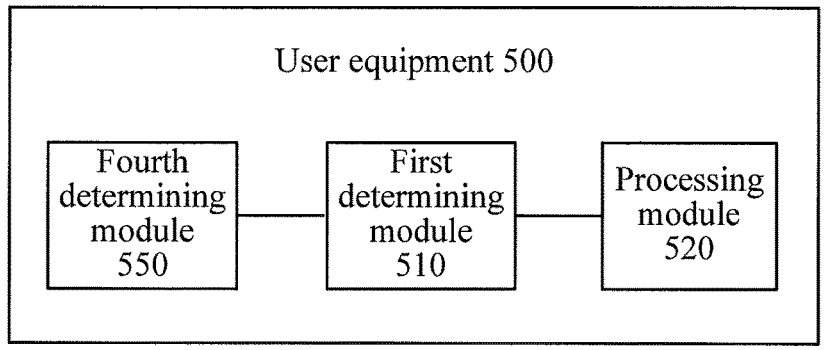
FIG. 16 is yet another schematic block diagram of a user equipment according to an embodiment of the present invention.

In the embodiment of the present invention, as shown in FIG. 16, optionally, the user equipment 500 further includes:

a fourth determining module 550, configured to determine a third parameter used to generate the pilot sequence;

where the first determining module 510 includes:

a third determining unit 513, configured to determine the first parameter according to the third parameter.

In the embodiment of the present invention, optionally, the third determining unit 513 includes:

a ninth determining subunit, configured to, if the third parameter is 0, determine that the first parameter is the timeslot number obtained after downlink synchronization; and if the third parameter is 1, determine that the first parameter is the predefined timeslot number, or the timeslot number obtained from the high layer notification, or the timeslot number obtained from the dynamic notification.

Optionally, the third determining unit 513 includes:

a tenth determining subunit, configured to, if the third parameter is 0, determine that the first parameter is the timeslot number obtained after downlink synchronization performed according to a first configuration resource in second type pilot configuration; and if the third parameter is 1, determine that the first parameter is the timeslot number obtained after downlink synchronization performed according to a second configuration resource in the second type pilot configuration.

Optionally, the third determining unit 513 includes:

an eleventh determining subunit, configured to, if the third parameter is 0, determine that a second parameter used to generate the pilot sequence is the $1^{st}$ parameter in a second parameter candidate set, and determine that the first parameter is the timeslot number obtained after downlink synchronization; and if the third parameter is 1, determine that the second parameter is the $2^{nd}$ parameter in the second parameter candidate set, and determine that the first parameter is the predefined timeslot number, or the timeslot number obtained from the high layer notification, or the timeslot number obtained from the dynamic notification.

Optionally, the third determining unit 513 includes:

a twelfth determining subunit, configured to, if the third parameter is 0, determine that a second parameter is the $1^{st}$ parameter in a second parameter candidate set, and determine that the first parameter is the timeslot number obtained after downlink synchronization performed according to a first configuration resource in second type pilot configuration; and if the third parameter is 1, determine that the second parameter is the $2^{nd}$ parameter in the second parameter candidate set, and determine that the first parameter is the timeslot number obtained after downlink synchronization performed according to a second configuration resource in the second type pilot configuration.

In the embodiment of the present invention, optionally, the first determining module 510 includes:

a fourth determining unit 514, configured to determine, according to dynamic or semi-static signaling sent by a base station, the first parameter in the timeslot numbers in the second type pilot configuration parameter.

Optionally, the first determining module 510 includes:

a fifth determining unit 515, configured to determine the first parameter according to a currently scheduled rank.

Optionally, the fifth determining unit 515 includes:

a thirteenth determining subunit, configured to, if the rank is not greater than a preset value, determine that the first parameter is the timeslot number obtained after downlink synchronization; and if the rank is greater than the preset value, determine that the first parameter is the predefined timeslot number, or the timeslot number obtained from the high layer notification, or the timeslot number obtained from the dynamic notification.

Optionally, the fifth determining unit 515 includes:

a fourteenth determining subunit, configured to, if the rank is not greater than a preset value, determine that the first parameter is the timeslot number obtained after downlink synchronization performed according to a first configuration resource in second type pilot configuration; and if the value is greater than the preset value, determine that the first parameter is the timeslot number obtained after downlink synchronization performed according to a second configuration resource in the second type pilot configuration.

The user equipment 500 according to the embodiment of the present invention may correspond to the user equipment in the method for generating a pilot sequence according to the embodiment of the present invention, and the above and other operations and/or functions of each module in the user equipment 500 are used to implement corresponding processes of methods in FIG. 1 to FIG. 9. For brevity, no description is given herein.

In the user equipment according to the embodiment of the present invention, by determining a first parameter used to generate a pilot sequence in a first parameter candidate set, orthogonal pairing between users under asynchronous cells can be implemented, thereby reducing interferences and improving channel estimation performance and detection performance.

Figure 17:
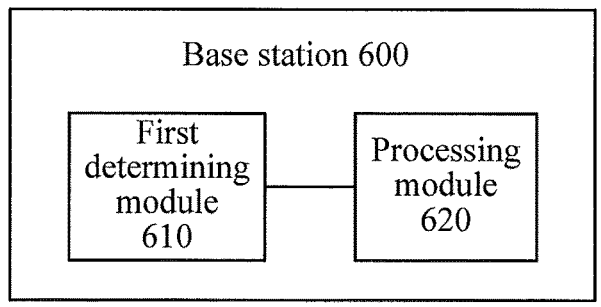
FIG. 17 is a schematic block diagram of a base station according to an embodiment of the present invention.

FIG. 17 is a schematic block diagram of a base station 600 according to an embodiment of the present invention. As shown in FIG. 17, the base station 600 includes:

a first determining module 610, configured to determine a first parameter used to generate a pilot sequence in a first parameter candidate set, where the first parameter candidate set includes at least two timeslot numbers of the following timeslot numbers: a downlink timeslot number of a primary serving cell, a predefined timeslot number, timeslot numbers in a second type pilot configuration parameter, and a timeslot number additionally configured by a network side, where a second type pilot is different from a pilot corresponding to the pilot sequence; and a processing module 620, configured to generate the pilot sequence according to the first parameter determined by the first determining module 610.

In the base station according to the embodiment of the present invention, by determining a first parameter used to generate a pilot sequence in a first parameter candidate set, orthogonal pairing between users under asynchronous cells can be implemented, thereby reducing interferences and improving channel estimation performance and detection performance.

Figure 18:
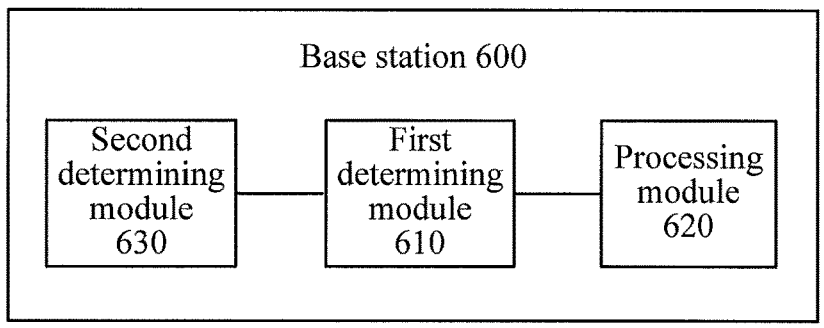
FIG. 18 is another schematic block diagram of a base station according to an embodiment of the present invention.

In the embodiment of the present invention, as shown in FIG. 18, optionally, the base station 600 further includes:

a second determining module 630, configured to determine a second parameter used to generate the pilot sequence in a second parameter candidate set;

where the first determining module 610 includes:

a first determining unit 611, configured to determine the first parameter according to the second parameter.

Optionally, the first determining unit 611 includes:

a first determining subunit, configured to, if the second parameter is the $1^{st}$ parameter in the second parameter candidate set, determine that the first parameter is the downlink timeslot number; and if the second parameter is the $2^{nd}$ parameter in the second parameter candidate set, determine that the first parameter is the predefined timeslot number or the additionally configured timeslot number.

Optionally, the first determining unit 611 includes:

a second determining subunit, configured to, if the second parameter is the $1^{st}$ parameter in the second parameter candidate set, determine that the first parameter is the timeslot number obtained after downlink synchronization performed according to the first configuration resource in the second type pilot configuration; and if the second parameter is the $2^{nd}$ parameter in the second parameter candidate set, determine that the first parameter is the timeslot number obtained after downlink synchronization performed according to the second configuration resource in the second type pilot configuration.

Optionally, the first determining unit 611 includes:

a third determining subunit, configured to, if the second parameter is a cell ID, determine that the first parameter is the downlink timeslot number; and if the second parameter is not the cell ID, determine that the first parameter is the predefined timeslot number or the additionally configured timeslot number.

Optionally, the first determining unit 611 includes:

a fourth determining subunit, configured to, if the second parameter is the cell ID, determine that the first parameter is the timeslot number obtained after downlink synchronization performed according to the first configuration resource in the second type pilot configuration; and if the second parameter is not the cell ID, determine that the first parameter is the timeslot number obtained after downlink synchronization performed according to the second configuration resource in the second type pilot configuration.

Optionally, the first determining unit 611 includes:

a fifth determining subunit, configured to, if the second parameter is smaller than or equal to the cell ID, determine that the first parameter is the downlink timeslot number; and if the second parameter is greater than the cell ID, determine that the first parameter is the predefined timeslot number or the additionally configured timeslot number.

Optionally, the first determining unit 611 includes:

a sixth determining subunit, configured to, if the second parameter is smaller than or equal to the cell ID, determine that the first parameter is the timeslot number obtained after downlink synchronization performed according to the first configuration resource in the second type pilot configuration; and if the second parameter is greater than the cell ID, determine that the first parameter is the timeslot number obtained after downlink synchronization performed according to the second configuration resource in the second type pilot configuration.

Figure 19:
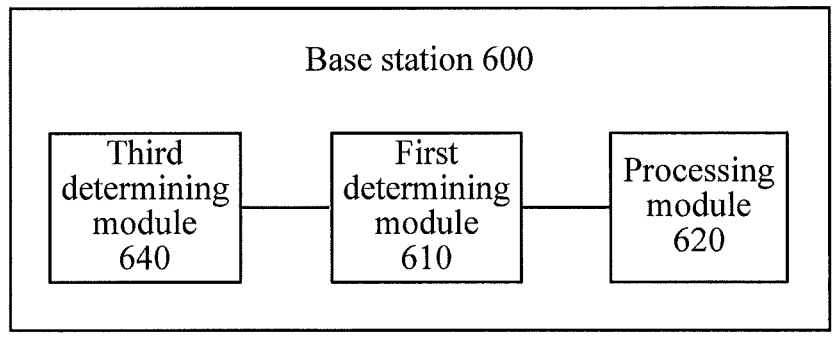
FIG. 19 is still another schematic block diagram of a base station according to an embodiment of the present invention.

In the embodiment of the present invention, as shown in FIG. 19, optionally, the base station 600 further includes:

a third determining module 640, configured to determine a great and small relationship between the $1^{st}$ parameter and the $2^{nd}$ parameter in a second parameter candidate set;

where the first determining module 610 includes:

a second determining unit 612, configured to determine the first parameter according to the great and small relationship.

Optionally, the second determining unit 612 includes:

a seventh determining unit, configured to, if the $1^{st}$ parameter is smaller than or equal to the $2^{nd}$ parameter, determine that the first parameter is the downlink timeslot number; and if the $1^{st}$ parameter is greater than the $2^{nd}$ parameter, determine that the first parameter is the predefined timeslot number or the additionally configured timeslot number.

Optionally, the second determining unit 612 includes:

an eighth determining unit, configured to, if the $1^{st}$ parameter is smaller than or equal to the $2^{nd}$ parameter, determine that the first parameter is the timeslot number obtained after downlink synchronization performed according to the first configuration resource in the second type pilot configuration; and if the $1^{st}$ parameter is greater than the $2^{nd}$ parameter, determine that the first parameter is the timeslot number obtained after downlink synchronization performed according to the second configuration resource in the second type pilot configuration.

Figure 20:
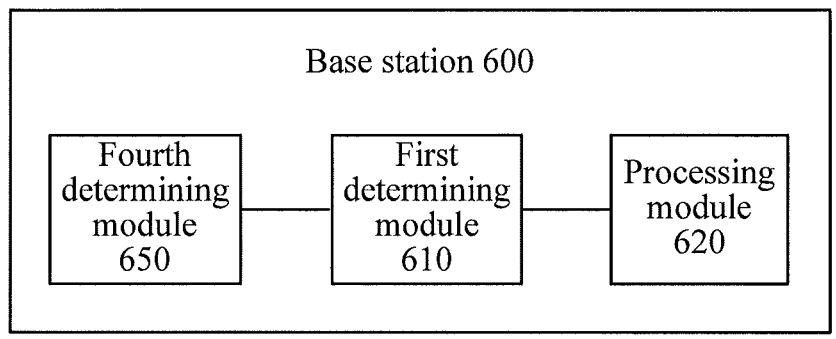
FIG. 20 is yet another schematic block diagram of a base station according to an embodiment of the present invention.

In the embodiment of the present invention, as shown in FIG. 20, optionally, the base station 600 further includes:

a fourth determining module 650, configured to determine a third parameter used to generate the pilot sequence;

where the first determining module 610 includes:

a third determining unit 613, configured to determine the first parameter according to the third parameter.

Optionally, the third determining unit 613 includes:

a ninth determining subunit, configured to, if the third parameter is 0, determine that the first parameter is the downlink timeslot number; and if the third parameter is 1, determine that the first parameter is the predefined timeslot number or the additionally configured timeslot number.

Optionally, the third determining unit 613 includes:

a tenth determining subunit, configured to, if the third parameter is 0, determine that the first parameter is the timeslot number obtained after downlink synchronization performed according to the first configuration resource in the second type pilot configuration; and if the third parameter is 1, determine that the first parameter is the timeslot number obtained after downlink synchronization performed according to the second configuration resource in the second type pilot configuration.

Optionally, the third determining unit 613 includes:

an eleventh determining subunit, configured to, if the third parameter is 0, determine that a second parameter used to generate the pilot sequence is the $1^{st}$ parameter in a second parameter candidate set, and determine that the first parameter is the downlink timeslot number; and if the third parameter is 1, determine that the second parameter is the $2^{nd}$ parameter in the second parameter candidate set, and determine that the first parameter is the predefined timeslot number or the additionally configured timeslot number.

Optionally, the third determining unit 613 includes:

a twelfth determining subunit, configured to, if the third parameter is 0, determine that the second parameter is the $1^{st}$ parameter in the second parameter candidate set, and determine that the first parameter is the timeslot number obtained after downlink synchronization performed according to the first configuration resource in the second type pilot configuration; and if the third parameter is 1, determine that the second parameter is the $2^{nd}$ parameter in the second parameter candidate set, and determine that the first parameter is the timeslot number obtained after downlink synchronization performed according to the second configuration resource in the second type pilot configuration.

In the embodiment of the present invention, optionally, the first determining module 610 includes:

a fourth determining unit 614, configured to determine the first parameter in the timeslot numbers in the second type pilot configuration parameter.

Optionally, the first determining module 610 includes:

a fifth determining unit 615, configured to determine the first parameter according to a currently scheduled rank.

Optionally, the fifth determining unit 615 includes:

a thirteen determining subunit, configured to, if the rank is not greater than a preset value, determine that the first parameter is the downlink timeslot number; and if the rank is greater than the preset value, determine that the first parameter is the predefined timeslot number or the additionally configured timeslot number.

Optionally, the fifth determining unit 615 includes:

a fourteenth determining subunit, configured to, if the rank is not greater than a preset value, determine that the first parameter is the timeslot number obtained after downlink synchronization performed according to the first configuration resource in the second type pilot configuration; and if the rank is greater than the preset value, determine that the first parameter is the timeslot number obtained after downlink synchronization performed according to the second configuration resource in the second type pilot configuration.

In the embodiment of the present invention, optionally, the base station 600 further includes:

a sending module 660, configured to, if the determined first parameter is the additionally configured timeslot number, send the additionally configured timeslot number through a high layer notification or a dynamic notification, or the additionally configured timeslot number and a time slot offset value of the downlink timeslot number to the user equipment, so that the user equipment obtains the additionally configured timeslot number.

The base station 600 according to the embodiment of the present invention may correspond to the base station in the method for generating a pilot sequence according to the embodiment of the present invention, and the above and other operations and/or functions of each module in the base station 600 are used to implement corresponding processes of methods in FIG. 1 to FIG. 9. For brevity, no description is given herein.

In the base station according to the embodiment of the present invention, by determining a first parameter used to generate a pilot sequence in a first parameter candidate set, orthogonal pairing between users under asynchronous cells can be implemented, thereby reducing interferences and improving channel estimation performance and detection performance.

Figure 21:
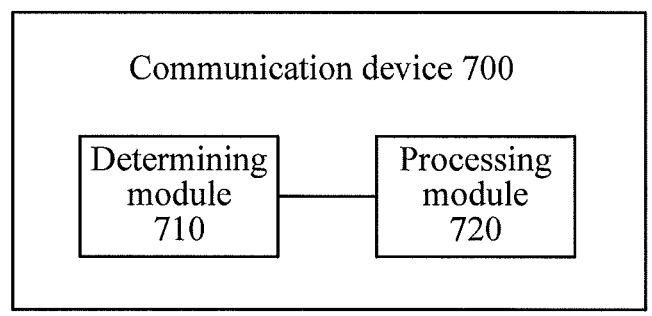
FIG. 21 is a schematic block diagram of a communication device according to another embodiment of the present invention.

FIG. 21 is a schematic block diagram of a communication device 700 according to another embodiment of the present invention. As shown in FIG. 21, the communication device 700 includes:

a determining module 710, configured to determine, according to a currently scheduled rank, a second parameter used to generate a pilot sequence, where the second parameter represents a virtual identifier ID; and a processing module 720, configured to generate the pilot sequence according to the second parameter determined by the determining module 710.

In the embodiment of the present invention, the communication device 700 may be a base station or may also be a user equipment.

In the communication device according to the embodiment of the present invention, by determining a second parameter used to generate a pilot sequence according to a currently scheduled rank, a degree of free selection of the second parameter is improved, thereby facilitating interference coordination.

Figure 22:
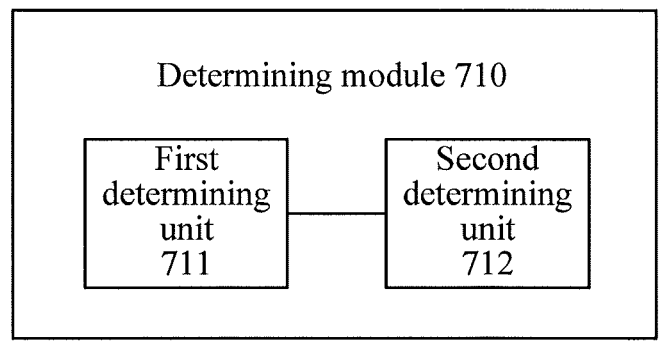
FIG. 22 is a schematic block diagram of a determining module according to another embodiment of the present invention.

In the embodiment of the present invention, as shown in FIG. 22, optionally, the determining module 710 includes:

a first determining unit 711, configured to, if the rank is greater than or equal to a preset value, determine the second parameter according to scheduling information of a latest rank being smaller than the preset value.

Optionally, the first determining unit 711 includes:

a first determining subunit, configured to determine the second parameter according to a scrambling code ID of the scheduling information of the latest rank being smaller than the preset value.

Optionally, the first determining unit 711 includes:

a second determining subunit, configured to determine that the second parameter is a second parameter adopted for the scheduling of the latest rank being smaller than the preset value.

In the embodiment of the present invention, as shown in FIG. 22, optionally, the determining module 710 includes:

a second determining unit 712, configured to, if the rank is greater than or equal to the preset value, determine the second parameter according to a timeslot number for downlink synchronization.

Optionally, the second determining unit 712 includes:

a third determining subunit, configured to determine the second parameter according to the timeslot number for downlink synchronization and correspondence between the timeslot number and the parameter in the second parameter candidate set.

The communication device 700 according to the embodiment of the present invention may correspond to the communication device in the method for generating a pilot sequence according to the embodiment of the present invention, and the above and other operations and/or functions of each module in the communication device 700 are used to implement corresponding processes of methods in FIG. 10 to FIG. 12. For brevity, no description is given herein.

In the communication device according to the embodiment of the present invention, by determining a second parameter used to generate a pilot sequence according to a currently scheduled rank, a degree of free selection of the second parameter is improved, thereby facilitating interference coordination.

It should be understood that in the embodiments of the present invention, the term "and/or" is only an association relationship for describing associated objects, and represents three relationships may exist. For example, A and/or B may represent three situations: A exists separately; A and B exist at the same time; and B exists separately. In addition, the character "/" in the specification generally represents that the former and latter associated objects are in an "or" relationship.

Persons of ordinary skill in the art may appreciate that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of every embodiment according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It can be clearly understood by a person skilled in the art that, for the purpose of convenient and brief description, for a detailed working process of the foregoing system, apparatus and unit, reference may be made to the corresponding process in the method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units herein may be selected according to the actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit are implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program codes, such as a USB flash disk, a removable hard disk, a read-only memory (ROM), a random access memory (RAM), a magnetic disk, or an optical disk.

The foregoing descriptions are merely specific embodiments of the present invention, but are not intended to limit the protection scope of the present invention. Any equivalent modification or replacement figured out by a person skilled in the art within the technical scope of the present invention shall fall within the protection scope of the present invention. Therefore, the protection scope of the present invention shall be subject to the protection scope of the claims.

What is claimed is:

1. A method, the method comprising:
when a user equipment is operating in a communication system having a first cell and a second cell, and timeslots of the second cell are asynchronous with timeslots of the first cell,
receiving, by the user equipment, signaling from a base station of the communication system,
determining, by the user equipment based on the signaling from the base station, a first parameter used to generate a pilot sequence in a first parameter candidate set, wherein the first parameter candidate set comprises:
a timeslot number obtained after downlink synchronization performed according to a first configuration resource in a second type pilot configuration and a timeslot number obtained after downlink synchronization performed according to a second configuration resource in the second type pilot configuration, wherein a second type pilot corresponding to the second type pilot configuration is different from a pilot corresponding to the pilot sequence; or
at least two of the following timeslot numbers:
a timeslot number obtained after downlink synchronization,
a timeslot number that is an integer preconfigured on the user equipment or on the base station of the communication system,
a timeslot number obtained from a high layer notification, and
a timeslot number obtained from a dynamic notification; and
generating, by the user equipment, the pilot sequence according to the first parameter, the pilot sequence coordinating interference between the user equipment and a second user equipment.

2. The method according to claim 1, further comprising:
determining, by the user equipment, a second parameter used to generate the pilot sequence in a second parameter candidate set, wherein the second parameter represents a virtual identifier (ID);
wherein the determining the first parameter comprises determining the first parameter according to the second parameter.

3. The method according to claim 2, wherein the determining the first parameter according to the second parameter comprises one of:
(1) if the second parameter is the $1^{st}$ parameter in the second parameter candidate set, determining that the first parameter is the timeslot number obtained after downlink synchronization; and if the second parameter is the $2^{nd}$ parameter in the second parameter candidate set, determining that the first parameter is the predefined timeslot number, or the timeslot number obtained from the high layer notification, or the timeslot number obtained from the dynamic notification;
(2) if the second parameter is the $1^{st}$ parameter in the second parameter candidate set, determining that the first parameter is the timeslot number obtained after downlink synchronization performed according to a first configuration resource in the second type pilot configuration; and if the second parameter is the $2^{nd}$ parameter in the second parameter candidate set, determining that the first parameter is the timeslot number obtained after downlink synchronization performed according to a second configuration resource in the second type pilot configuration;
(3) if the second parameter is a cell ID, determining that the first parameter is the timeslot number obtained after downlink synchronization; and if the second parameter is not the cell ID, determining that the first parameter is the predefined timeslot number, or the timeslot number obtained from the high layer notification, or the timeslot number obtained from the dynamic notification;
(4) if the second parameter is a cell ID, determining that the first parameter is the timeslot number obtained after downlink synchronization performed according to a first configuration resource in the second type pilot configuration; and if the second parameter is not the cell ID, determining that the first parameter is the timeslot number obtained after downlink synchronization performed according to a second configuration resource in the second type pilot configuration;
(5) if the second parameter is smaller than or equal to a cell ID, determining that the first parameter is the timeslot number obtained after downlink synchronization; and if the second parameter is greater than the cell ID, determining that the first parameter is the predefined timeslot number, or the timeslot number obtained from the high layer notification, or the timeslot number obtained from the dynamic notification; or
(6) if the second parameter is smaller than or equal to a cell ID, determining that the first parameter is the timeslot number obtained after downlink synchronization performed according to a first configuration resource in the second type pilot configuration; and if the second parameter is greater than the cell ID, determining that the first parameter is the timeslot number obtained after downlink synchronization performed according to a second configuration resource in the second type pilot configuration.

4. The method according to claim 1, further comprising:
determining, by the user equipment, a great and small relationship between the $1^{st}$ parameter and the $2^{nd}$ parameter in a second parameter candidate set, wherein the second parameter candidate set comprises at least two virtual IDs;
wherein the determining a first parameter used to generate the pilot sequence in a first parameter candidate set comprises:
determining, by the user equipment, the first parameter according to the great and small relationship.

5. The method according to claim 4, wherein the determining the first parameter according to the great and small relationship comprises one of:
(1) if the $1^{st}$ parameter is smaller than or equal to the $2^{nd}$ parameter, determining that the first parameter is the timeslot number obtained after downlink synchronization; and if the $1^{st}$ parameter is greater than the $2^{nd}$ parameter, determining that the first parameter is the predefined timeslot number, or the timeslot number obtained from the high layer notification, or the timeslot number obtained from the dynamic notification; or
(2) if the $1^{st}$ parameter is smaller than or equal to the $2^{nd}$ parameter, determining that the first parameter is the timeslot number obtained after downlink synchronization performed according to a first configuration resource in the second type pilot configuration; and if the $1^{st}$ parameter is greater than the $2^{nd}$ parameter, determining that the first parameter is the timeslot number obtained after downlink synchronization performed according to a second configuration resource in the second type pilot configuration.

6. The method according to claim 1, further comprising:
determining, by the user equipment, a third parameter used to generate the pilot sequence, wherein the third parameter represents a scrambling code ID;
wherein the determining a first parameter used to generate the pilot sequence in a first parameter candidate set comprises:
determining, by the user equipment, the first parameter according to the third parameter.

7. The method according to claim 6, wherein the determining the first parameter according to the third parameter comprises one of:
(1) if the third parameter is 0, determining that the first parameter is the timeslot number obtained after downlink synchronization; and if the third parameter is 1, determining that the first parameter is the predefined timeslot number, or the timeslot number obtained from the high layer notification, or the timeslot number obtained from the dynamic notification;
(2) if the third parameter is 0, determining that the first parameter is the timeslot number obtained after downlink synchronization performed according to a first configuration resource in the second type pilot configuration; and if the third parameter is 1, determining that the first parameter is the timeslot number obtained after downlink synchronization performed according to a second configuration resource in the second type pilot configuration;
(3) if the third parameter is 0, determining that a second parameter used to generate the pilot sequence is the $1^{st}$ parameter in a second parameter candidate set, and determining that the first parameter is the timeslot number obtained after downlink synchronization; and if the third parameter is 1, determining that the second parameter is the $2^{nd}$ parameter in the second parameter candidate set, and determining that the first parameter is the predefined timeslot number, or the timeslot number obtained from the high layer notification, or the timeslot number obtained from the dynamic notification, wherein the second parameter represents a virtual ID; or (4) if the third parameter is 0, determining that a second parameter is the $1^{st}$ parameter in a second parameter candidate set, and determining that the first parameter is the timeslot number obtained after downlink synchronization performed according to a first configuration resource in the second type pilot configuration; and if the third parameter is 1, determining that the second parameter is the $2^{nd}$ parameter in the second parameter candidate set, and determining that the first parameter is the timeslot number obtained after downlink synchronization performed according to a second configuration resource in the second type pilot configuration, wherein the second parameter represents a virtual ID.

8. The method according to claim 1, wherein
the signaling from the base station is dynamic or semi-static signaling,
the first parameter candidate set includes timeslot numbers in the second type pilot configuration parameter, and
the determining the first parameter used to generate the pilot sequence in a first parameter candidate set comprises:
determining, by the user equipment according to the dynamic or semi-static signaling, the first parameter in the timeslot numbers in the second type pilot configuration parameter.

9. The method according to claim 1, wherein the timeslot number obtained from the high layer notification comprises a timeslot number directly notified by a high layer, or a sum of the timeslot number obtained after downlink synchronization and a timeslot offset value notified by the high layer; and the timeslot number obtained from the dynamic notification comprises a dynamically directly notified timeslot number, or a sum of the timeslot number obtained after downlink synchronization and a dynamically notified timeslot offset value.

10. A user equipment, comprising:
a processor-readable medium having processor-executable instructions stored thereon;
a receiver configured to receive signaling from the base station; and
a processor configured to execute the processor-executable instructions to, when the user equipment is operating in a communication system having a first cell and a second cell and timeslots of the second cell are asynchronous with timeslots of the first cell,
based on the signaling received from the base station, determine a first parameter used to generate the pilot sequence in a first parameter candidate set, wherein the first parameter candidate set comprises:
a timeslot number obtained after downlink synchronization performed according to a first configuration resource in a second type pilot configuration and a timeslot number obtained after downlink synchronization performed according to a second configuration resource in the second type pilot configuration, wherein a second type pilot corresponding to the second type pilot configuration is different from a pilot corresponding to the pilot sequence; or
at least two of the following timeslot numbers:
a timeslot number obtained after downlink synchronization,
a timeslot number that is an integer preconfigured on the user equipment or on a base station of the communication system,
a timeslot number obtained from a high layer notification, and
a timeslot number obtained from a dynamic notification;
generate the pilot sequence according to the first parameter determined by the processor, the pilot sequence coordinating interference between the user equipment and a second user equipment.

11. The user equipment according to claim 10, wherein the processor executes the processor-executable instructions to:
determine a second parameter used to generate the first pilot sequence in a second parameter candidate set, wherein the second parameter represents a virtual identifier (ID); and
determine the first parameter according to the second parameter.

12. The user equipment according to claim 11, wherein the processor executes the processor-executable instructions to:
(1) if the second parameter is the $1^{st}$ parameter in the second parameter candidate set, determine that the first parameter is the timeslot number obtained after downlink synchronization; and if the second parameter is the $2^{nd}$ parameter in the second parameter candidate set, determine that the first parameter is the predefined timeslot number, or the timeslot number obtained from the high layer notification, or the timeslot number obtained from the dynamic notification;
(2) if the second parameter is the $1^{st}$ parameter in the second parameter candidate set, determine that the first parameter is the timeslot number obtained after downlink synchronization performed according to a first configuration resource in the second type pilot configuration; and if the second parameter is the $2^{nd}$ parameter in the second parameter candidate set, determine that the first parameter is the timeslot number obtained after downlink synchronization performed according to a second configuration resource in the second type pilot configuration;
(3) if the second parameter is a cell ID, determine that the first parameter is the timeslot number obtained after downlink synchronization; and if the second parameter is not the cell ID, determine that the first parameter is the predefined timeslot number, or the timeslot number obtained from the high layer notification, or the timeslot number obtained from the dynamic notification;
(4) if the second parameter is a cell ID, determine that the first parameter is the timeslot number obtained after downlink synchronization performed according to a first configuration resource in the second type pilot configuration; and if the second parameter is not the cell ID, determine that the first parameter is the timeslot number obtained after downlink synchronization performed according to a second configuration resource in the second type pilot configuration;

(5) if the second parameter is smaller than or equal to a cell ID, determine that the first parameter is the timeslot number obtained after downlink synchronization; and if the second parameter is greater than the cell ID, determine that the first parameter is the predefined timeslot number, or the timeslot number obtained from the high layer notification, or the timeslot number obtained from the dynamic notification; or (6) if the second parameter is smaller than or equal to a cell ID, determine that the first parameter is the timeslot number obtained after downlink synchronization performed according to a first configuration resource in the second type pilot configuration; and if the second parameter is greater than the cell ID, determine that the first parameter is the timeslot number obtained after downlink synchronization performed according to a second configuration resource in the second type pilot configuration.

13. The user equipment according to claim 10, wherein the processor executes the processor-executable instructions to:

determine a great and small relationship between the $1^{st}$ parameter and the $2^{nd}$ parameter in a second parameter candidate set, wherein the second parameter candidate set comprises at least two virtual IDs; and determine the first parameter according to the great and small relationship.

14. The user equipment according to claim 13, wherein the processor executes the processor-executable instructions to:

(1) if the $1^{st}$ parameter is smaller than or equal to the $2^{nd}$ parameter, determine that the first parameter is the timeslot number obtained after downlink synchronization; and if the $1^{st}$ parameter is greater than the $2^{nd}$ parameter, determine that the first parameter is the predefined timeslot number, or the timeslot number obtained from the high layer notification, or the timeslot number obtained from the dynamic notification; or (2) if the $1^{st}$ parameter is smaller than or equal to the $2^{nd}$ parameter, determine that the first parameter is the timeslot number obtained after downlink synchronization performed according to a first configuration resource in the second type pilot configuration; and if the $1^{st}$ parameter is greater than the $2^{nd}$ parameter, determine that the first parameter is the timeslot number obtained after downlink synchronization performed according to a second configuration resource in the second type pilot configuration.

15. The user equipment according to claim 10, wherein the processor executes the processor-executable instructions to:

determine a third parameter used to generate the first sequence, wherein the third parameter represents a scrambling code ID; and determine the first parameter according to the third parameter.

16. The user equipment according to claim 15, wherein the processor executes the processor-executable instructions to:

(1) if the third parameter is 0, determine that the first parameter is the timeslot number obtained after downlink synchronization; and if the third parameter is 1, determine that the first parameter is the predefined timeslot number, or the timeslot number obtained from the high layer notification, or the timeslot number obtained from the dynamic notification;

(2) if the third parameter is 0, determine that the first parameter is the timeslot number obtained after downlink synchronization performed according to a first configuration resource in the second type pilot configuration; and if the third parameter is 1, determine that the first parameter is the timeslot number obtained after downlink synchronization performed according to a second configuration resource in the second type pilot configuration;

(3) if the third parameter is 0, determine that a second parameter used to generate the first sequence is the $1^{st}$ parameter in a second parameter candidate set, and determine that the first parameter is the timeslot number obtained after downlink synchronization; and if the third parameter is 1, determine that the second parameter is the $2^{nd}$ parameter in the second parameter candidate set, and determine that the first parameter is the predefined timeslot number, or the timeslot number obtained from the high layer notification, or the timeslot number obtained from the dynamic notification, wherein the second parameter represents a virtual ID; or (4) if the third parameter is 0, determine that a second parameter is the $1^{st}$ parameter in a second parameter candidate set, and determine that the first parameter is the timeslot number obtained after downlink synchronization performed according to a first configuration resource in the second type pilot configuration; and if the third parameter is 1, determine that the second parameter is the $2^{nd}$ parameter in the second parameter candidate set, and determine that the first parameter is the timeslot number obtained after downlink synchronization performed according to a second configuration resource in the second type pilot configuration, wherein the second parameter represents a virtual ID.

17. The user equipment according to claim 10, wherein the signaling from the base station is dynamic or semi-static signaling, the first parameter candidate set includes timeslot numbers in the second type pilot configuration parameter, and the processor executes the processor-executable instructions to determine, according to the dynamic or semi-static signaling, the first parameter in the timeslot numbers in the second type pilot configuration parameter.

* * * * *